(12) United States Patent
Xu et al.

(10) Patent No.: US 12,149,371 B2
(45) Date of Patent: Nov. 19, 2024

(54) MRB DEACTIVATION AND ACTIVATION

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Naveen Kumar R. Palle Venkata, San Diego, CA (US); Ralf Rossbach, Munich (DE); Sarma V. Vangala, Campbell, CA (US); Sethuraman Gurumoorthy, San Ramon, CA (US); Srirang A. Lovlekar, Fremont, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,740

(22) PCT Filed: May 10, 2021

(86) PCT No.: PCT/CN2021/092853
§ 371 (c)(1),
(2) Date: May 6, 2022

(87) PCT Pub. No.: WO2022/236610
PCT Pub. Date: Nov. 17, 2022

(65) Prior Publication Data
US 2024/0154834 A1    May 9, 2024

(51) Int. Cl.
*H04L 12/18* (2006.01)
*H04W 76/19* (2018.01)

(52) U.S. Cl.
CPC ........ *H04L 12/189* (2013.01); *H04L 12/1868* (2013.01); *H04W 76/19* (2018.02)

(58) Field of Classification Search
CPC .. H04L 12/189; H04L 12/1868; H04W 76/19; H04W 76/30; H04W 76/15
See application file for complete search history.

(56) References Cited

U.S. PATENT DOCUMENTS

2020/0204329 A1    6/2020  Fujishiro et al.
2022/0124463 A1*   4/2022  Zhang ..................... H04W 4/06
2024/0015850 A1*   1/2024  Fujishiro ............... H04W 76/40

FOREIGN PATENT DOCUMENTS

CN    111866975    10/2020
EP    2 200 367    6/2010

OTHER PUBLICATIONS

Ericsson, Email discussion report for [post113-e][054][MBS17] PTP/PTM dynamic switch and MRB change, Apr. 12, 2021-Apr. 20, 2021, pp. 1-27 (Year: 2021).*

(Continued)

*Primary Examiner* — Farid Seyedvosoghi
(74) *Attorney, Agent, or Firm* — Fay Kaplun & Marcin, LLP

(57) ABSTRACT

A user equipment (UE) is configured to deactivate/activate a point-to-multipoint (PTM) link of a multicast radio bearer (MRB). The UE receives, from a base station of a wireless network, a multicast radio bearer (MRB) configuration, wherein the MRB includes configuration of a split MRB including a point to multipoint (PTM) link and a point to point (PTP) link, deactivates or activates the PTM link based on the MRB configuration, reestablishes a radio link control (RLC) associated with the PTM link and recovers a packet data convergence protocol (PDCP).

20 Claims, 5 Drawing Sheets

(56) References Cited

OTHER PUBLICATIONS

Ericsson, "Email discussion report for [Post113-e][054][MBS17] PTP/PTM Dynamic switch and MRB type change"; 3GPP TSG-RAN WG2 #113bis-e; R2-2103518; Apr. 20, 2021; 27 sheets.

\* cited by examiner

MRB DEACTIVATION AND ACTIVATION

TECHNICAL FIELD

This application relates generally to wireless communication, and in particular relates to MRB Deactivation and Activation.

BACKGROUND

In 5G new radio (NR) wireless communications, a multimedia broadcast multicast service (MEMS) is a service that provides a point-to-multipoint service where a base station sends data to a plurality of users, thus implementing network resource sharing and improving resource utilization.

SUMMARY

Some exemplary embodiments are related to a processor of a user equipment (UE) configured to perform operations. The operations include receiving, from a base station of a wireless network, a multicast radio bearer (MRB) configuration, wherein the MRB includes configuration of a split MRB including a point to multipoint (PTM) link and a point to point (PTP) link, deactivating or activating the PTM link based on the MRB configuration, reestablishing a radio link control (RLC) associated with the PTM link and recovering a packet data convergence protocol (PBCP).

Other exemplary embodiments are related to a user equipment (UE) having a transceiver configured to communicate with a network and a processor communicatively coupled to the transceiver and configured to perform operations. The operations include receiving, from a base station of the network, a multicast radio bearer (MRB) configuration, wherein the MRB includes configuration of a split MRB including a point to multipoint (PTM) link and a point to point (PIP) link, deactivating or activating the PTM link based on the MRB configuration, reestablishing a radio link control (RLC) associated with the PTM link and recovering a packet data convergence protocol (PDCP).

DETAILED DESCRIPTION

Figure 1:
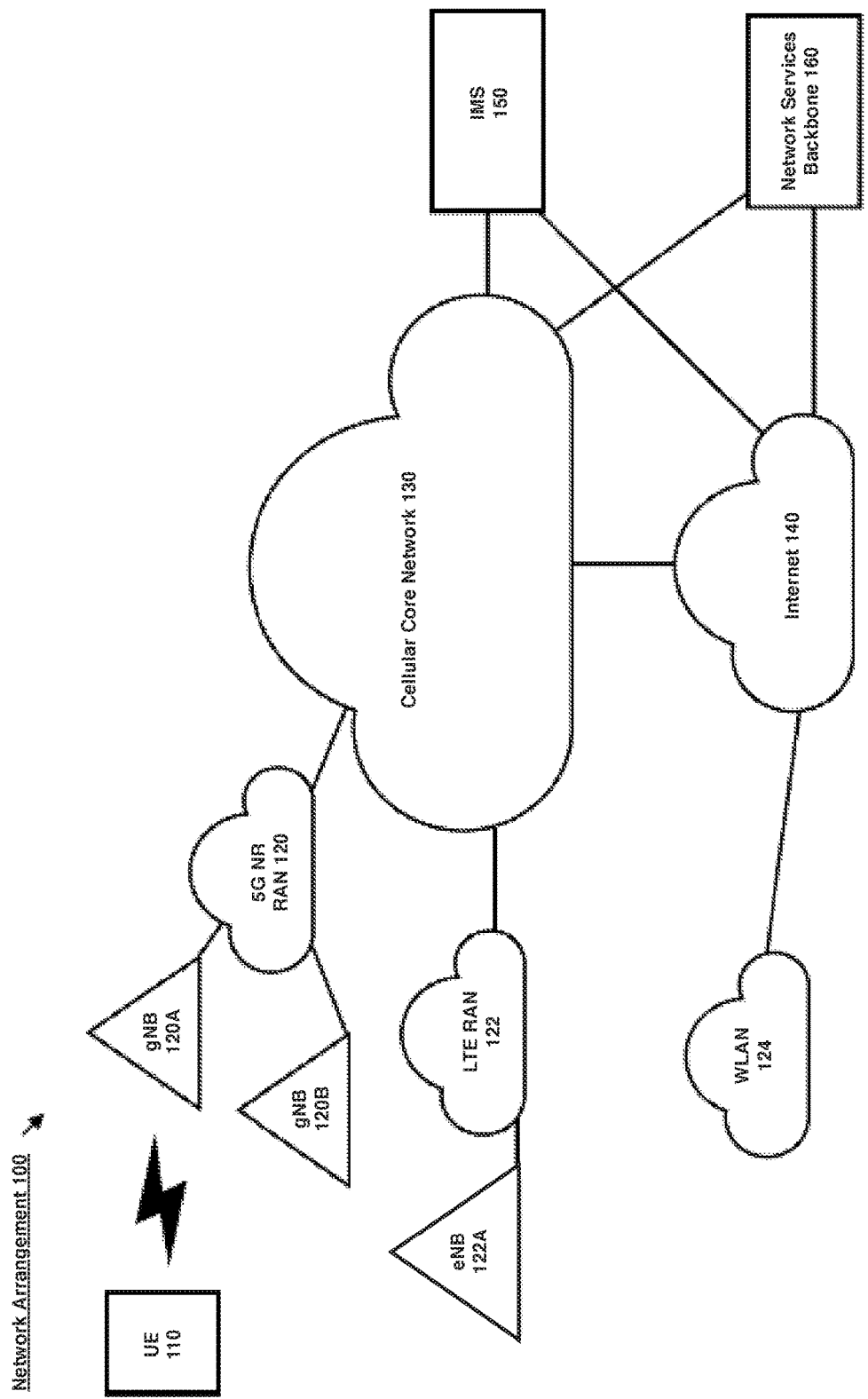
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to how a user equipment (UE) handles a deactivation/activation of a point-to-multipoint (PTM) link of a multicast radio bearer (MRB).

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information, and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

If an MRB's quality of service (QoS) requirements are not met by its PTM link, the MRB may switch to its point-to-point (PTP) link to transmit multimedia broadcast multicast service (MEMS) data to a plurality of UEs. However, the UEs may continue to monitor the PTM link even though the MBMS data is not being transmitted over that link, thus wasting power at the UE.

According to the exemplary embodiments, the network may configure the UE with the activation status (activated or deactivated) of the PTM link of the MRB and/or one or more criteria for the deactivation of the PTM link. Upon deactivation of the PTM link of the MRB, the UE performs layer 2 (L2) operations to receive the MBMS data over the PTP link of the MRB.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UK 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LIE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IM 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
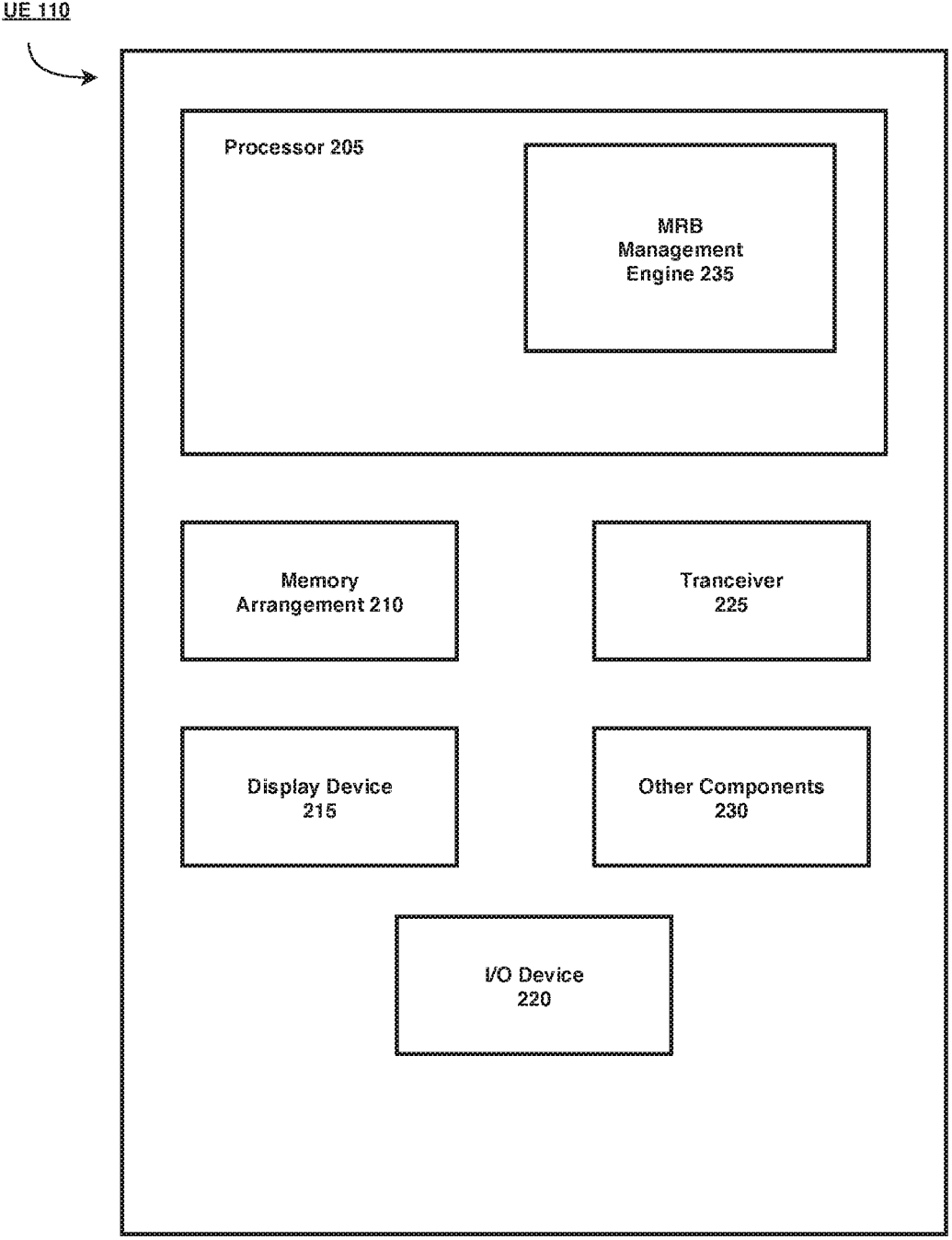
FIG. 2 shows an exemplary user equipment (UK) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include an MRB management engine 235. The MRB management engine 235 may perform various operations related to deactivating or activating the PTM link of a split MRB, as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
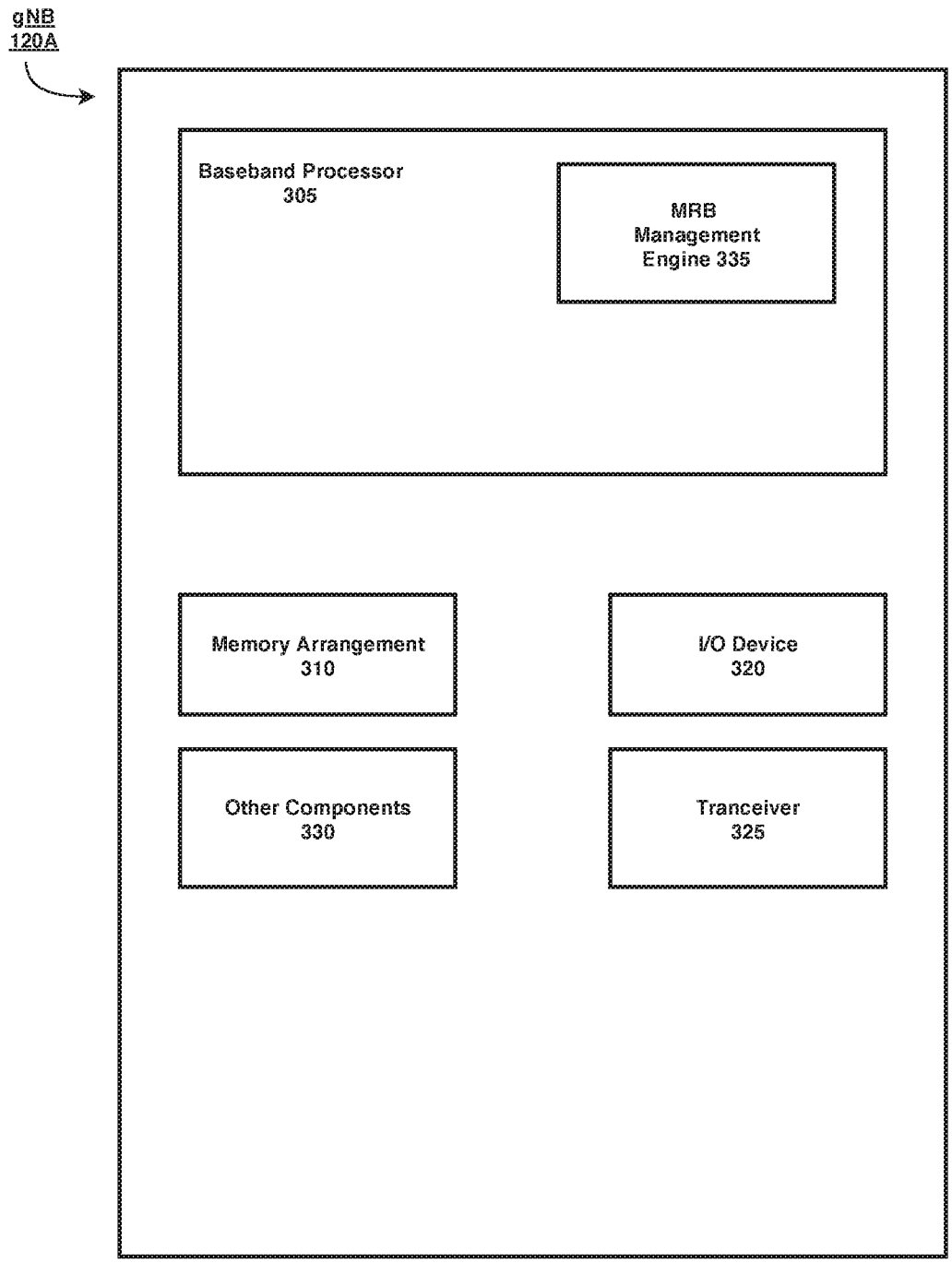
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UE 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include an MRB management engine 335 for performing operations including deactivating or activating the PTM link of a split MRB. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
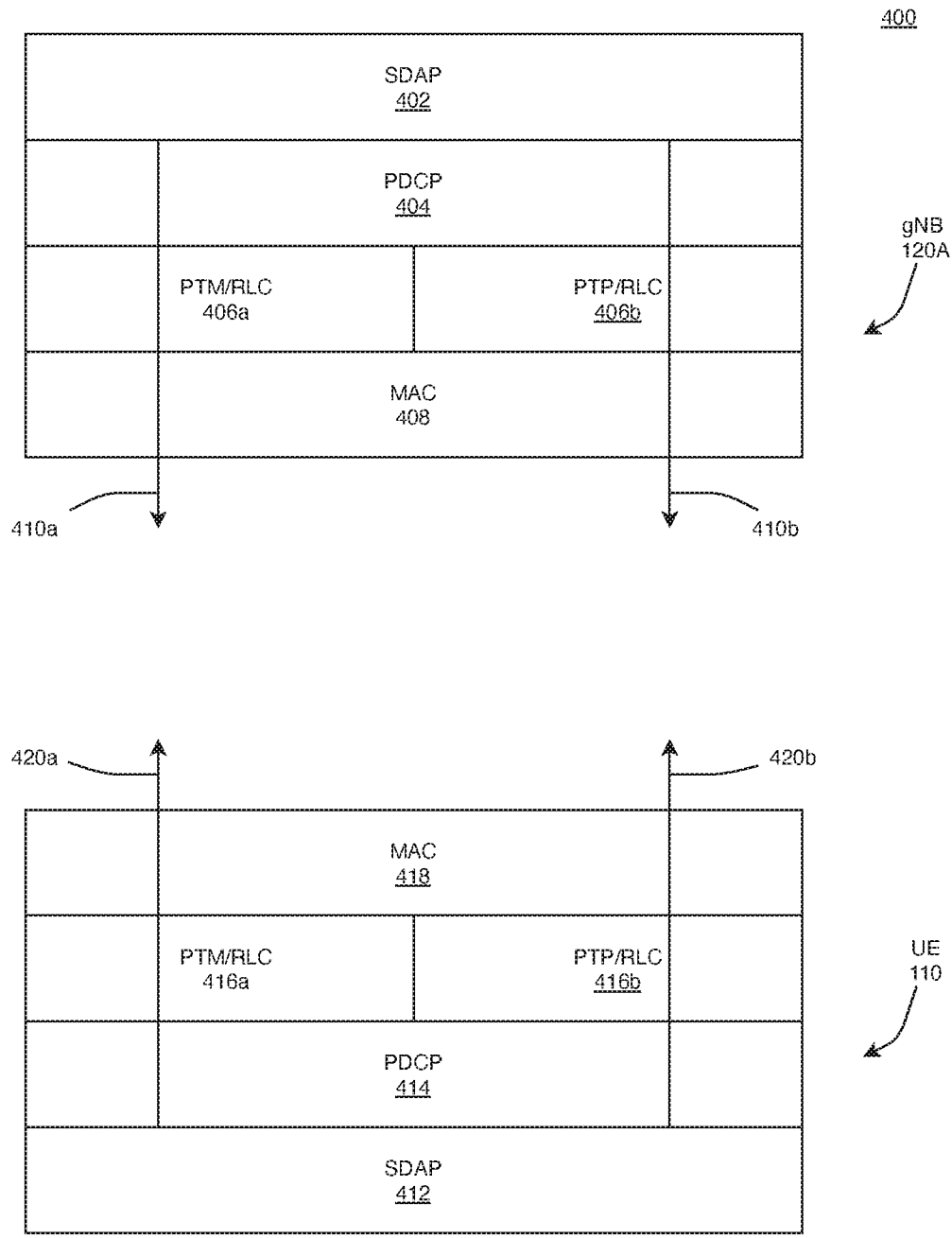
FIG. 4 shows an exemplary split multicast radio bearer (MRB) for a base station, and a UE according to various exemplary embodiments.

FIG. 4 shows an exemplary split multicast radio bearer (MRB) 400 for a base station (gNB 120A) and a UE (UE 110) according to various exemplary embodiments. The split-MRB 400 at the gNB 120A may include a service data adaptation protocol (SDAP) layer 402 to provide a multicast data flow (M-Flow) to the lower layers. The split-MRB 400 at the gNB 120A further includes a packet data convergence protocol (PDCP) layer 404, a PTM radio link control (RLC) layer 406a, a PTP RLC layer 406b, and a medium access control (MAC) layer 408. Data on the PTM link 410a flows from the SDAP layer 402 to the MAC layer 408 via the PDCP layer 404 and the PTM RLC layer 406a on a multicast traffic channel (MTCH). Data on the PTP link 410b flows from the SDAP layer 402 to the MAC layer 408 via the PDCP layer 404 and the PTP RLC layer 406a on a dedicated traffic channel (DTCH). The UK 110 similarly includes an SDAP layer 412, a PDCP layer 414, a PTM RLC 416a, a PIP RLC 416b, and a MAC layer 418. Data on the PTM link 410a flows from the UE's SDAP layer 412 to the MAC layer 418 via the PDCP layer 414 and the PTM RLC layer 416a on a MTCH. Data on the PTP link 410b flows from the UE's SDAP layer 412 to the MAC layer 418 via the PDCP layer 414 and the PIP RLC layer 416a on a DTCH.

The SDAP layer 402 may process requests from and provide indications to one or more higher layer protocol entities. These requests and indications may comprise one or more QoS flows. The SDAP layer 402 may map QoS flows to the split MRH 400, and vice versa, and may also mark QoS flow identifiers (QFIs) in DL and UL packets. A single SDAP layer 402 may be configured for an individual protocol data unit (PDU) session.

The PDCP layer 404 may process requests from and provide indications to one or more radio resource control (RRC) layers (not shown) and/or the SDAP layer 402. These requests and indications may comprise one or more radio bearers (e.g., split MCG bearer 400). The PDCP layer 404 may execute header compression and decompression of internet protocol (IP) data, maintain PDCP sequence numbers (SNs), perform in-sequence delivery of upper layer PDUs at re-establishment of lower layers, eliminate duplicates of lower layer service data units (SDUs) at re-establishment of lower layers for radio bearers mapped on RLC acknowledgement mode (AM), cipher and decipher control plane data, perform integrity protection and integrity verification of control plane data, control timer-based discard of data, and perform security operations.

The RLC layers 406a,b may process requests from and provide indications to the PDCP layer 404. The RLC layers 406a,b may operate in a plurality of modes of operation, including AM, Transparent Mode (TM), and Unacknowledged Mode (UM). The RLC layers 406a,b may execute transfer of upper layer PDUs, error correction through automatic repeat request (ARQ) for AM data transfers, and concatenation, segmentation and reassembly of RLC SDUs for UM and AM data transfers. The RLC layers 406a,b may also execute resegmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The MAC layer 408 may process requests from, and provide indications to, the RLC layers 406a,b. The MAC layer 408 may perform mapping between the logical channels and transport channels, multiplexing of MAC SDUs from one or more logical channels onto transport blocks (TBs) to be delivered to a physical layer (not shown) via the transport channels, de-multiplexing MAC SDUs to one or more logical channels from TBs delivered from the physical layer via transport channels, multiplexing MAC SDUs onto TBs, scheduling information reporting, error correction through hybrid ARQ (HARQ), and logical channel prioritization.

Figure 5:
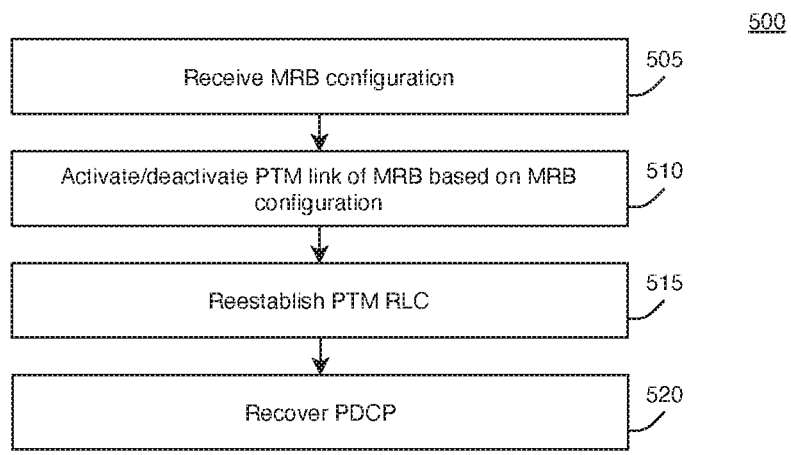
FIG. 5 shows a method of deactivating/activating a point-to-multipoint (PTM) link of an MRB according to various exemplary embodiments.
Figure 6:
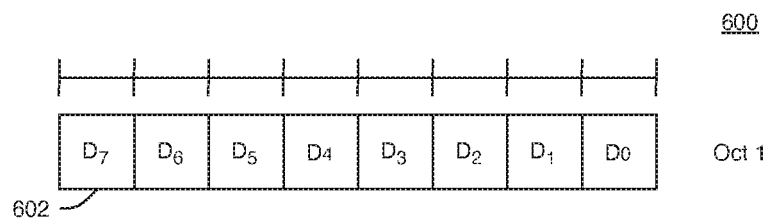
FIG. 6 shows an exemplary medium access control (MAC) control element (CE) indicating an activation/deactivation status of one or more MRBs according to various exemplary embodiments.

FIG. 5 shows a method 500 of deactivating/activating a point-to-multipoint (PTM) link of an MRB according to various exemplary embodiments. At 505, the UE 110 receives an MRB configuration from the gNB 120A (or 120B). In some embodiments, the MRB configuration may include explicit Layer 2 (L2) or Layer 3 (L3) signaling that indicates whether the PTM link 410a is activated or deactivated. In some embodiments, the L3 signaling may be RRC signaling including a new pdcp-PtmActivation information element (IE) in the PDCP configuration of the split MRB 400. In some embodiments, the L2 signaling may include a MAC CE 600, as depicted in FIG. 6, that includes a plurality of fields 602, each of which indicates the activation/deactivation status of a corresponding MRB (e.g., a PTM link of a split MRB), where a value of 1 indicates the MRB is activated and a value of 0 indicates the MRB is deactivated. As such, the gNB 120A may use one MAC CE 600 to indicate the activation/deactivation status of a plurality of MRBs.

In some embodiments, the MRB configuration may be an implicit configuration that includes a predetermined criteria which, when met, triggers the UE 110 to deactivate the PTM link 410a. In some embodiments, the predetermined criteria may be a reference signal received power (RSRP) threshold. In such an embodiment, when the UE's radio quality is less than the RSRP threshold (e.g., UE 110 moves further away from gNB 120B), the UE 110 may deactivate the PTM link 410a at 510. In some embodiments, the UE 110 may send an indication to the gNB 120A that the PTM link 410a has been deactivated. In some embodiments, the indication may be an explicit indication provided by the UE 110 to the gNB 120A via L2 or L3 signaling. In some embodiments, the indication may alternatively be an implicit indication via an RSRP measurement report or a PDCP status report. In some embodiments, the UE 110 may alternatively request that the gNB 120A deactivate the PTM link once the UE 110 determines that the predetermined criteria has been met.

In some embodiments, the predetermined criteria may alternatively be a measurement event which, when it occurs, causes the UE 110 to deactivate the PTM link 410a at 510. For example, the measurement event may be a primary cell (PCell) A2 event (serving becomes worse than threshold), as defined in the 3GPP standards. In some embodiments, the UE 110 may send an indication to the gNB 120A that the PTM link 410a has been deactivated. In some embodiments, the indication may be an explicit indication provided by the UE 110 to the gNB 120A via L2 or L3 signaling. In some embodiments, the indication may alternatively be an implicit indication via the measurement report or a PDCP status report. In some embodiments, the UE 110 may alternatively request that the gNB 120A deactivate the PTM link once the UE 110 determines that the predetermined criteria has been met.

In some embodiments, the predetermined criteria may alternatively be the expiration of an RLC Try-reassembly timer, which defines the time period the UE 110 will wait to receive a missing segment of an RLC PDU. Upon expiration of the timer, the entire RLC PDU will be lost, which will trigger the UE 110 to deactivate the PTM link 410a at 510. In some embodiments, the UE 110 may send an indication to the gNB 120A that the PTM link 410a has been deactivated. In some embodiments, the indication may be an explicit indication provided by the UE 110 to the gNB 120A via L2 or L3 signaling. In some embodiments, the indication may alternatively be an implicit indication via a measurement report or a PDCP status report. In some embodiments, the UE 110 may alternatively request that the gNB 120A deactivate the PTM link once the UE 110 determines that the predetermined criteria has been met.

In some embodiments, the predetermined criteria may alternatively be the expiration of a PDCP T-reordering timer, which defines the time period the UE 110 will wait to receive a an out of order PDCP data packet. Upon expiration of the timer, the PDCP PDU will be lost, which will trigger the UE 110 to deactivate the PTM link 410a at 510. In some embodiments, the UE 110 may send an indication to the gNB 120A that the PTM link 410a has been deactivated. In some embodiments, the indication may be an explicit indication provided by the UE 110 to the gNB 120A via L2 or L3 signaling. In some embodiments, the indication may alternatively be an implicit indication via a PDCP status report. In some embodiments, the UE 110 may alternatively request that the gNB 120A deactivate the PTM link once the UE 110 determines that the predetermined criteria has been met.

In some embodiments, the predetermined criteria may alternatively be the detection of a radio link failure (RLF) event by the UE 110 on the primary cell group (PCG). Once the UE 110 detects the RLF on the PCG, it may deactivate the PTM link 410a at 510. In some embodiments, the UE 110 may send an indication to the gNB 120A that the PTM link 410a has been deactivated. In some embodiments, the indication may be an explicit indication provided by the UE 110 to the gNB 120A via L2 or L3 signaling. In some embodiments, the indication may alternatively be an implicit indication via a measurement report or a PDCP status report. In some embodiments, the UE 110 may alternatively request that the gNB 120A deactivate the PTM link once the UE 110 determines that the predetermined criteria has been met.

Once the UE 110 determines that the PTM link 410a has been deactivated, the UE 110 reestablishes, at 515, the PTM RLC 406a. At 520, the UE 110 recovers the PDCP 404. In some embodiments, the UE 110 performs these operations autonomously. In some embodiments, the UE 110 may alternatively be configured by the gNB 120A to perform these operations via RRC signaling. In some embodiments, the UK 110 performs these operations immediately upon the deactivation of the PTM link 410a. In some embodiments, the UE 110 may alternatively wait a predefined period of time after deactivation of the PTM link 410a to perform these operations. In such an embodiment, the predefined period of time may be defined by 3GPP standards or may be configured by the gNB 120A.

In some embodiments, reestablishing the PTM RLC entity may include discarding all RLC service data units (SDUs), RLC SDU segments, and RLC PDUs, if any. In some embodiments, reestablishing the PTM RLC entity may further include stopping and resetting all timers (e.g., RLC T-reassembly timer, PDCP T-reordering timer, etc.). In some embodiments, reestablishing the PTM RLC entity may further include resetting all state variables to their initial values. For example, the UK 110 may set the RX Next (a receive state variable), RX Next Highest (highest receive state variable), and RX Next Reassembly (UM receive state variable) variables to zero.

In some embodiments, recovering the PDCP 404 may include processing the RLC PDU delivered by the PTM RLC 406a. In some embodiments, recovering the PDCP 404 may further include triggering a PDCP status report and transmitting the PDCP status report over the PTP link 410b to the gNB 120A. The PDCP status report informs the transmitting PDCP 404 which PDCP PDUs were received and which ones were lost. The PDCP status report may also implicitly indicate to the gNB 120A the status (activated or deactivated) of the PIM link 410a. Upon receiving the PDCP status report on the PIP link 410b, the gNB 120A retransmits the lost PDCP PDUs over the PTP link 410b.

In addition to these operations, once the UE 110 deactivates the PIM link 410a, the UK's PHY layer stops monitoring the scheduling for the deactivated PIM link 410a. In addition, the UE's MAC layer stops processing the data of the logical channel associated with the deactivated PTM link 4110a.

Once the PTM link 410a is reactivated (if at all), the UE 110 performs the L2 operations discussed above and begins to monitor the scheduling for the activated PTM/RLC 406a based on a 3GPP standards defined time period or on a network-configured time period.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
receiving, from a base station of a wireless network, a multicast radio bearer (MRB) configuration, wherein the MRB includes configuration of a split MRB including a point to multipoint (PTM) link and a point to point (PTP) link and an implicit indication of whether the PTM link should be activated or deactivated, wherein the implicit indication includes a predetermined criteria, and wherein satisfaction of the predetermined criteria indicates the PTM link should be deactivated;

deactivating or activating the PTM link based on the MRB configuration;

reestablishing a radio link control (RLC) associated with the PTM link; and recovering a packet data convergence protocol (PDCP).

2. The processor of claim 1, wherein the predetermined criteria is a reference signal received power (RSRP) threshold, and wherein when an RSRP of the PTM link falls below the RSRP threshold, the PTM link is deactivated.

3. The processor of claim 1, wherein the predetermined criteria is a predefined measurement event, and wherein when the measurement event occurs, the PTM link is deactivated.

4. The processor of claim 3, wherein the predefined measurement event is an A2 event on a primary cell (PCell).

5. The processor of claim 1, wherein the predetermined criteria is expiration of an RLC T-reassembly timer, wherein the PTM link is deactivated upon expiration of the RLC T-reassembly timer before reception of a missing RLC protocol data unit (PDU) segment.

6. The processor of claim 1, wherein the predetermined criteria is expiration of a PDCP T-reordering timer, wherein the PTM link is deactivated upon expiration of the PDCP T-reordering timer before reception of an out of order PDCP PDU.

7. The processor of claim 1, wherein the predetermined criteria is a radio link failure (RLF) in a primary cell group (PCG) serving the UE.

8. The processor of claim 1, wherein, when the PTM link is deactivated, the operations further comprise:

transmitting an indication to the base station that the PTM link has been deactivated.

9. The processor of claim 8, wherein the indication is an explicit indication provided via Layer 2 (L2) or Layer 3 (L3) signaling.

10. The processor of claim 8, wherein the indication is an implicit indication provided via a measurement report that indicates the predetermined criteria has been met.

11. The processor of claim 1, wherein reestablishing the RLC associated with the PTM comprises:

discarding all RLC service data units (SDUs), RLC SDU segments, and RLC PDUs;

stopping and resetting all timers; and resetting all state variables to their initial values.

12. The processor of claim 1, wherein recovering the PDCP comprises:

processing an RLC PDU delivered by a PTM RLC of the split MRB;

triggering a PDCP status report; and transmitting the PDCP status report to the base station over the PTP link.

13. The processor of claim 12, wherein the operations further comprise:

receiving a retransmission of lost PDCP PDUs over the PTP link from the base station.

14. The processor of claim 1, wherein, when the PTM link is reactivated after being deactivated, the operations further comprise:

repeating the reestablishing of the RLC associated with the PTM link; and repeating the recovering of the PDCP.

15. A user equipment (UE), comprising:

a transceiver configured to communicate with a network; and a processor communicatively coupled to the transceiver and configured to perform operations comprising:

receiving, from a base station of the network, a multicast radio bearer (MRB) configuration, wherein the MRB includes configuration of a split MRB including a point to multipoint (PTM) link and a point to point (PTP) link and an implicit indication of whether the PTM link should be activated or deactivated, wherein the implicit indication includes a predetermined criteria, and wherein satisfaction of the predetermined criteria indicates the PTM link should be deactivated;

deactivating or activating the PTM link based on the MRB configuration;

reestablishing a radio link control (RLC) associated with the PTM link; and recovering a packet data convergence protocol (PDCP).

16. The UE of claim 15, wherein the predetermined criteria is a reference signal received power (RSRP) threshold, and wherein when an RSRP of the PTM link falls below the RSRP threshold, the PTM link is deactivated.

17. The UE of claim 15, wherein the predetermined criteria is a predefined measurement event, and wherein when the measurement event occurs, the PTM link is deactivated.

18. The UE of claim 15, wherein the predetermined criteria is expiration of an RLC T-reassembly timer, wherein the PTM link is deactivated upon expiration of the RLC T-reassembly timer before reception of a missing RLC protocol data unit (PDU) segment.

19. The UE of claim 15, wherein the predetermined criteria is expiration of a PDCP T-reordering timer, wherein the PTM link is deactivated upon expiration of the PDCP T-reordering timer before reception of an out of order PDCP PDU.

20. The UE of claim 15, wherein the predetermined criteria is a radio link failure (RLF) in a primary cell group (PCG) serving the UE.

* * * * *